United States Patent Office 3,832,151
Patented Aug. 27, 1974

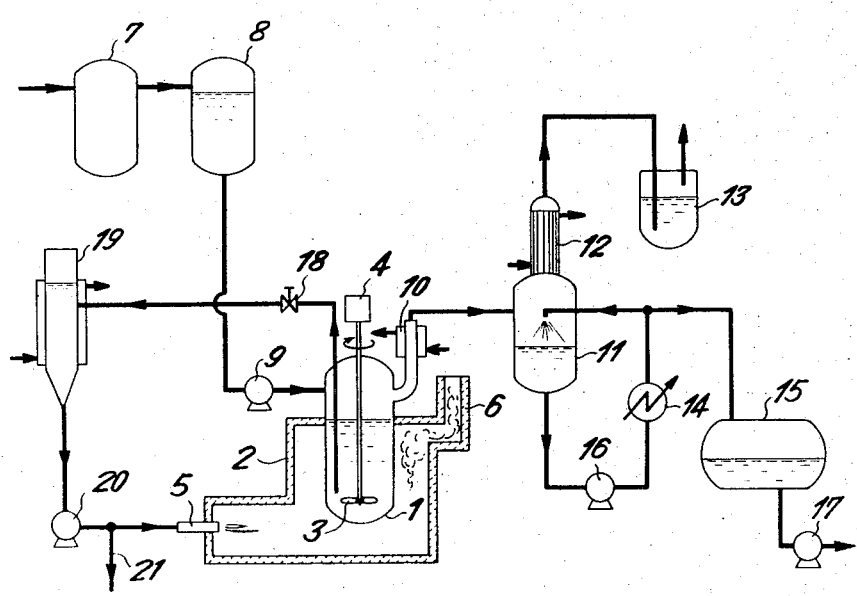

3,832,151
PROCESS AND APPARATUS FOR DISPOSAL
OF PLASTIC WASTES
Yoji Kitaoka, Katsuhide Murata, Kotaro Hama, Michio Hashimoto, and Kenji Fujiyoshi, Chiba, Japan, assignors to Mitsui Shipbuilding and Engineering Co., Ltd., and Mitsui Petrochemical Industries Limited, both of Tokyo, Japan
Filed Feb. 28, 1973, Ser. No. 336,473
Claims priority, application Japan, Mar. 18, 1972, 47/27,967
Int. Cl. C10j 3/00; F23g 7/00
U.S. Cl. 48—111                                    4 Claims

ABSTRACT OF THE DISCLOSURE

A process for plastic wastes disposal characterized in that plastic wastes are thermally decomposed, the product is cooled and separated into gaseous product and liquid product, and carbon sludge in the reactor content is dispersed to avoid the deposition of such carbon sludge and a part of the reactor content is discharged to reduce the carbon sludge in the reactor.

---

This invention relates to an apparatus for disposal of palstic wastes, such as plastic packaging materials, one-way plastic containers (bottles), and by-product and substandard polymers from synthetic resin plants (polyethylene of low molecular weight and atactic polypropylene). It has been proposed that the thermal decomposition could be applied to the plastic wastes disposal. However, none of such apparatuses converting to oil and gas by thermal process have been completed because deposition of carbon sludge produced by thermal process has prevented the continuous operation.

Accordingly, a primary object of this invention is to provide an apparatus and processes which makes continuous and successful decomposition of plastic wastes possible without any accumulation and deposition of carbon sludge. Another object of this invention is to provide an apparatus and processes which convert plastic wastes into its components which have universal value as fuel or raw material for chemical industries.

The apparatus in accordance with this invention is characterized by such a structure that the molten material is fed continuously and thermally decomposed in the reactor which is a vessel and is provided with a strong agitator. The volatile which is produced by thermal decomposition is fed to a condenser and separated into two parts one volatile gaseous product and the other less volatile oily product. A part of reactor content, the residual oil in the reactor, is continuously removed to prevent the accumulation and/or deposition of carbon sludge, and this residual oil is used for the fuel for the reactor. The heat of decomposition can be supplied completely with the burning of residual oil.

Our invention is schematically shown in the attached drawing. The reactor 1 is a cylindrical vessel, provided with inlet and effluent ports and a agitator 3. A driving unit 4 is affixed to the agitator shaft. 2 is a furnace which supplies the heat of thermal decomposition, provided with a burner 5 and a stack 6. Plastic wastes to be treated are crushed into clips and melted at about 200° C. in the melter 7. The molten material is one held in a drum 8, and then charged to the reactor vessel 1 by a pump 9. The charged material is heated up and begins to decompose at about 350° C. The temperature in the reactor is controlled at about 400° C.–450° C. If the pressure is elevated, the composition of the product is varied. The effluent from the reactor is partially condensed by a condenser 10, and introduced into a product drum 11. The drum 11 is provided with a vent condenser 12 and sealing pot 13. The liquefied product is stored in the drum 11, but some uncondensable gases which pass through the vent condenser are flared or used for fuel. To prevent the overheat, the liquid product is cooled by a heat exchanger 14. 16 is a recycle pump. When the liquid in the drum exceeds a predetermined level, the liquid is sent to a drum 15. 17 is a transfer pump. On the other hand, to prevent the increase of carbon sludge in the reactor, a part of reactor content is continuously or intermittently discharged and sent to a drum 19 through a valve 18. From the drum 19, a part of the material is fed by a pump 20 to the burner 5 and another part to another device through the line 21. Since the temperature of reactor content is too high, about 400° C., its temperature is reduced to about 250° C. in drum 19. If the burner 5 is a mixed type, the fuel gas and the fuel oil can be burnt at the same time. If necessary, it is possible that carbon sludge and/or poisonous metal components in the discharged reactor content are removed by any methods and then the harmless oil is returned to the reactor again.

EXAMPLE 1

Polyethylene and polypropylene were thermally decomposed by a tank reactor having an inner diameter of 150 mm. and a depth of 500 mm. Results are shown below.

| Material | Polyethylene | Polypropylene |
|---|---|---|
| Feed rate of material, kg./hr | 8.0 | 8.0 |
| Decomposition conditions: | | |
| Decomposition temperature, ° C | 440 | 425 |
| Decomposition pressure, atm | 1.0 | 1.0 |
| Agitation rate, r.p.m | 500 | 500 |
| Amount of product oil, kg./hr | 7.2 | 7.1 |
| Amount gaseous product, kg./hr | 0.4 | 0.5 |
| Amount of discharged reactor content, kg./hr | 0.4 | 0.4 |
| Properties of product oil: | | |
| Specific gravity (15/4°) | 0.7932 | 0.7895 |
| Viscosity (50° C), cst | 2.79 | 1.95 |
| Average molecular weight | 227 | 195 |
| Calorific value, cal./g | 11,500 | 11,000 |
| Sulfur content | None | None |
| Average molecular weight of gaseous product | 38.0 | 36.8 |
| Composition of gaseous product, percent: | | |
| $H_2$ | 0.9 | 1.2 |
| $CH_4$ | 13.5 | 11.5 |
| $C_2H_4$ | 9.4 | 0.0 |
| $C_2H_6$ | 17.4 | 15.4 |
| $C_3H_6$ | 20.8 | 65.1 |
| $C_3H_8$ | 18.7 | 6.8 |
| $C_4H_8$ | 11.6 | 0.0 |
| $C_4H_{10}$ | 7.7 | 0.0 |

EXAMPLE 2

Low molecular weight polyethylene byproduct of PE plant and atactic polypropylene were thermally decomposed by such a reactor shown in the drawing. Results are as follows:

| Material | Polyethylene | Polypropylene |
|---|---|---|
| Feed rate of material, kg./hr | 1,000 | 1,200 |
| Decomposition conditions: | | |
| Decomposition temperature, ° C | 410 | 405 |
| Decomposition pressure, atm | 3.0 | 3.0 |
| Agitation rate, r.p.m | 100 | 100 |
| Amount of product oil, kg./hr | 900 | 1,065 |
| Amount of gaseous product, kg./hr | 50 | 75 |
| Amount of discharged reactor content, kg./hr | 50 | 60 |
| Properties of product oil: | | |
| Specific gravity (15/4°) | 0.7867 | 0.7807 |
| Viscosity (50° C.), cst | 1.71 | 1.63 |
| Average molecular weight | 190 | 182 |
| Calorific value, cal./g | 10,900 | 10,700 |
| Sulfur content | None | None |
| Average molecular weight of gaseous product | 38.7 | 37.7 |
| Composition of gaseous product, percent: | | |
| $H_2$ | 0.8 | 1.0 |
| $CH_4$ | 11.7 | 9.3 |
| $C_2H_4$ | 9.1 | 0.3 |
| $C_2H_6$ | 17.5 | 13.9 |
| $C_3H_6$ | 21.0 | 68.0 |
| $C_3H_8$ | 19.1 | 6.6 |
| $C_4H_8$ | 12.7 | 0.7 |
| $C_4H_{10}$ | 8.1 | 0.2 |

The advantages of our foregoing invention are as follows.

1. Heat that is required to decompose the plastic wastes is self-sufficient.
2. Carbon sludge is continuously removed so that the deposition of carbon sludge in the reactor may be avoided.
3. Continuous and long time operation may be permitted, for the reactor is free from carbon deposition.
4. Useful and convenient materials to handle is recovered.

What is claimed is:

1. A method for treating solid wastes of plastic materials comprising the steps of feeding the material into a decomposition chamber, thermally decomposing said material and cooling the volatile product of decomposition to separate it into gaseous and liquid products, dispersing residual solid components from said decomposition in the liquid product to avoid the deposition of such residual components on the interior surface of said chamber, withdrawing a part of the liquid product with the solid components dispersed therein to therby prevent concentration of the residual components in the decomposition chamber, and using a part of the withdrawn liquid product in a combustion furnace to heat the decomposition chamber.

2. A method according to claim 1 including the step of preliminarily melting the plastic waste material prior to feeding it into the decomposition chamber, said step of dispersing the solid components including the step of agitating the liquid contents of the decomposition chamber.

3. A method according to claim 2 wherein the cooling of the gaseous decomposition product is effected outside of said decomposition chamber by condensing a part of the volatile product as it is discharged from the decomposition chamber.

4. Apparatus for treating solid wastes of plastic material comprising a decomposition chamber, furnace means to heat said chamber, means to feed plastic material into said chamber for thermal decomposition therein, including means to render said plastic material molten, an outlet for the volatile products of the thermal decomposition, a condenser to cool said volatile decomposition products in said outlet to separate the same into a gaseous product and a liquid product, the liquid product returning to the chamber, an agitator in the chamber for dispersing the solid components of said molten plastic into the liquid products in said chamber, means for withdrawing a part of the liquid contents of said chamber including the solid components dispersed therein, and means for feeding said withdrawn liquid to said furnace for combustion to supply heat for the thermal decomposition of the material in said chamber.

References Cited

UNITED STATES PATENTS

| | | | |
|---|---|---|---|
| 3,362,887 | 1/1968 | Rodgers | 48—209 X |
| 3,702,039 | 11/1972 | Stookey et al. | 48—209 X |
| 3,733,187 | 5/1973 | Feldmann | 48—209 |

R. E. SERWIN, Primary Examiner

U.S. Cl. X.R.

48—209; 110—8 R, 18 R